May 1, 1956  R. E. SEELY ET AL  2,744,226
MOTOR PROTECTOR CIRCUIT
Filed July 25, 1955
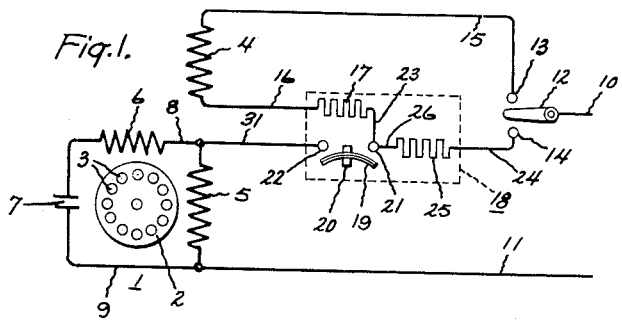
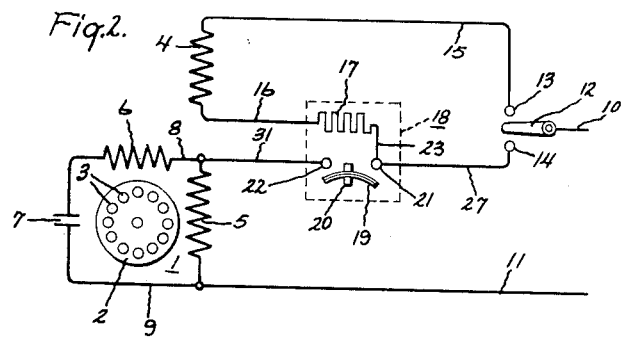
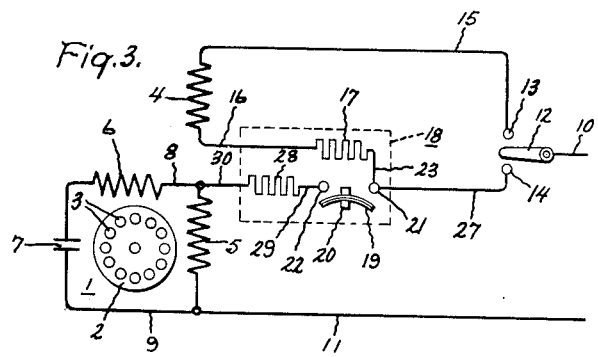
Inventors:
Richard E. Seely,
James A. Walley,
by Robert G. True
Their Attorney.

United States Patent Office 2,744,226
Patented May 1, 1956

2,744,226
MOTOR PROTECTOR CIRCUIT

Richard E. Seely and James A. Walley, Fort Wayne, Ind., assignors to General Electric Company, a corporation of New York Application July 25, 1955, Serial No. 524,035

5 Claims. (Cl. 318—221)

This invention relates to alternating current electric motor circuits, and more particularly to protector circuits for multispeed single phase alternating current induction type motors.

A common construction of multispeed alternating current induction motors involves the use of a single running winding section for the highest speed desired, with an additional running winding section being added in series with the first running winding section across the line for each progressively lower speed. Since the winding sections are added in series across the line, the current required by the motor, both for running conditions and under stalled conditions, will become lower as additional winding sections are added, with the highest current being experienced at the highest running speed, that is, with only the single running winding section connected across the line. The fact that the current required by the motor varies with the speed connection has made it quite difficult to provide the windings with thermal protection which will give consistent protection at approximately the same value for any speed connection. For instance, many motors are required to have a running winding temperature no greater than 125° C.; however where a single thermal protector is provided, adjustment for trip-out at 125° C. under high speed running conditions will not provide a trip-out under low speed running conditions until a substantially higher temperature is reached. On the other hand, if the protective device is set to operate at 125° C. at a lower speed, the motor will be subjected to nuisance trip-outs at the higher speed since the higher current in the motor winding will be sensed by the protector and falsely interpreted as signifying a higher temperature. It is, therefore, desirable to provide a heater circuit, for multispeed alternating current induction type motors wherein the different speeds are obtained by adding running winding sections in series across the line, and which will substantially equalize the winding temperature for trip-out of the motor whatever the selected speed. Once such an arrangement is provided, nuisance trip-outs and the possibility of burning out a low speed winding cease to present any problem.

It is, therefore, an object of this invention to provide an improved protector circuit for induction type electric motors which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broader aspects, this invention provides a multispeed single phase alternating current induction type motor which includes first and second running winding sections connected in series. A lead extends from the end of the first of the sections which is electrically remote from the second of the sections, and a second lead is connected to a point electrically intermediate the sections. The leads are adapted to be selectively connected to one side of a source of power. A third lead extends from the end of the second section which is electrically remote from the first section, and is adapted to be connected to the other side of the source of power. A bimetallic element is connected in series with the sections and is electrically located intermediate the point to which the second lead is connected and the second section. A heating element is arranged physically adjacent the bimetallic element and is electrically located intermediate the point of connection of the second lead and the first section.

In the drawing, Figure 1 is a schematic illustration of a first embodiment of the improved circuit of this invention;

Figure 2 is a schematic illustration of another embodiment of the improved circuit of this invention; and Figure 3 is a schematic illustration of yet another embodiment of the improved circuit of this invention.

Referring now to Figure 1 of the drawing, there is shown a single phase alternating current electric motor of the induction type, generally indicated at 1, having a rotor 2 provided with squirrel-cage bars 3. Field windings 4, 5 and 6 are provided, with winding 6 being arranged in series with a capacitor 7, and connected across winding 5 through lines 8 and 9. Winding 6 is preferably physically displaced angularly in space from winding 5, and it will be observed that this arrangement provides a starting torque for the motor by providing relatively rotating magnetic fields. The starting arrangement is set forth for purposes of illustration in order to describe a complete and operative motor; it is not intended to form any part of this invention and it will be understood that any other well-known standard starting arrangement, such as, for instance, a capacitor-start circuit or a shaded pole construction may be utilized to equal advantage.

A pair of lines 10 and 11 are provided for connecting the motor 1 across a source of alternating current power (not shown). Line 10 terminates in a switch arm 12 which is selectively engageable with one of two contacts 13 and 14. Contact 13 is connected through a line 15 to winding section 4 which is in turn connected through a line 16 to a heating element 17 of a protector 18. Protector 18 is provided with a bimetallic element 19 secured at 20 and arranged to be engageable with a pair of contacts 21 and 22. Heating element 17 is connected to contact 21 through line 23 and contact 22 is connected through line 31 to winding 5 which is then connected through line 11 back to the source of power. Returning to contact 14, a line 24 connects this contact to a second heating element 25 of protector device 18. Heating element 25 is connected through line 26 to contact 21. Both of the heating elements 17 and 25 are arranged in physical proximity to the bimetallic element 19 so that in addition to having the motor current press through it, the element 19 is also sensitive to the heat given off by elements 17 and 25.

When it is desired to operate motor 1 at high speed, contact arm 12 is moved into engagement with contact 14. A circuit will then be completed through line 24, heating element 25, line 26, contact 21, bimetallic element 19, contact 22, line 31, winding 5 and line 11. A parallel circuit through line 8, winding 6, capacitor 7 and line 9 provides for starting of the motor. The motor will consequently start and come up to a predetermined speed with the motor current passing through both heating element 25 and bimetallic element 19. The bimetallic element is sensitive to the ambient temperature and to the current passing through it and will reach a temperature in accordance with those conditions. This temperature is modified by the proximity of the heating element 25 which further increases the temperature of the bimetallic element 19 in accordance with the current passing through the heating element 25. Thus, the motor runs on winding 5 until the conditions become such that bimetallic element 19 snaps away from the contact 21 and 22 to open the circuit.

When low speed operation is desired, contact arm 12 is moved out of engagement with contact 14 and into engagement with contact 13. A circuit will then be completed through line 15, winding section 4, line 16, heating element 17, line 23, contact 21, bimetallic element 19, contact 22, and through windings 5 and 6 as before. The addition of winding 4 in series with winding 5 across the line causes motor 1 to operate at a lower rate of speed and also causes the motor to draw less current. Consequently, heating element 17 is provided with a higher resistance than heating element 25. Since it is known that the heat provided is proportional to $I^2R$, it then becomes feasible to provide heating elements 17 and 25 where the resistance of heating element 17 is sufficiently larger than that of heating element 25 to compensate for the lower current and to provide for tripping of the motor at approximately the same winding temperature. It will thus be seen that this invention provides, in combination with an alternating current multispeed induction motor where the different speeds are provided by adding running windings sections in series across the line, a protector arrangement whereby the inherent current differential present at the different running speeds as a result of the inherent characteristics of the motor does not prevent tripping of the motor at substantially the same winding temperature for the different speeds of operation.

Referring now to Figure 2 of the drawing, the second embodiment of this invention will be described using like numerals for like parts. The essential difference between this arrangement and the embodiment of Figure 1 is that the second heater element 25 of the embodiment of Figure 1 has been omitted and contact 14 is directly connected by a line 27 to contact 21 of protector 18. This arrangement may be used where it is possible to select the resistance of bimetallic element 19 so as to achieve substantially the tripping temperature desired at the two speeds. While it is sometimes difficult to achieve such a result with only the bimetallic element cooperating with heating element 17, it will be recognized that, where feasible, the arrangement of Figure 2 provides considerable economy.

In the third embodiment, shown in Figure 3, where like parts are again shown by like numerals, the second heater 28 is connected to contact 22 of protector 18 by a line 29 and to winding 5 by a line 30. With this arrangement, not only the bimetallic element 19, but also the heater 28 is in series in the motor circuit at both speed connections. With the arrangement of Figure 3, the two resistors do not act individually upon the bimetallic element 19 but, instead, both heating elements 17 and 28 are in the line at the lower running speed while only element 28 is in the line at the higher running speed.

It will be seen from the foregoing descriptions that all three embodiments of this invention which have been described provide the advantageous feature of elimination of both the nuisance trip-out and the possibility of burning out windings.

While this invention has been explained by describing particular embodiments thereof, it will be apparent that improvements and modifications may be made without departing from the scope of the invention as defined in the appended claims.

What we claim as new and desire to secure by Letters Patent of the United States is:

1. A multispeed single phase alternating current induction-type motor comprising a pair of running winding sections connected in series, a lead extending from the end of the first of said sections which is electrically remote from the second of said sections, a second lead connected to a point electrically intermediate said sections, said leads being adapted to be selectively connected to one side of a source of power, a third lead extending from the end of said second section which is electrically remote from said first section and adapted to be connected to the other side of the source of power, a bimetallic element connected in series with said sections and electrically located intermediate said point and said second section, and a heating element physically adjacent said bimetallic element and electrically located intermediate said point and said first section.

2. A multispeed single phase alternating current induction-type motor comprising a pair of running winding sections connected in series, a lead extending from the end of the first of said sections which is electrically remote from the second of said sections, a second lead including a heating element connected to a point electrically intermediate said sections, said leads being adapted to be selectively connected to one side of a source of power, a third lead extending from the end of the second section which is electrically remote from said first section and adapted to be connected to the other side of the source of power, a bimetallic element connected in series with said sections and electrically located intermediate said point and said second section, said heating element being arranged physically adjacent said bimetallic element, and a second heating element electrically located intermediate said point and said first section and physically arranged adjacent said bimetallic element.

3. A multispeed single phase alternating current induction-type motor comprising a pair of running winding sections connected in series, a lead extending from the end of the first of said sections which is electrically remote from the other of said sections, a second lead connected to a point electrically intermediate said sections, said leads being adapted to be selectively connected to one side of a source of power, a third lead extending from the end of the second section which is electrically remote from said first section and adapted to be connected to the other side of the source of power, a bimetallic element connected in series with said sections and electrically located intermediate said point and said second section, a heating element physically adjacent said bimetallic element and electrically located intermediate said point and said first section, and a second heating element physically adjacent said bimetallic element and electrically located intermediate said point and said second section.

4. A multispeed single phase alternating current induction-type motor comprising a pair of running winding sections connected in series, a lead extending from the end of the first of said sections which is electrically remote from the second of said sections, a second lead including a heating element connected to a point electrically intermediate said sections, said leads being adapted to be selectively connected to one side of a source of power, a third lead extending from the end of the second section which is electrically remote from said first section and adapted to be connected to the other side of the source of power, a bimetallic element connected in series with said sections and electrically located intermediate said point and said second section, said heating element being arranged physically adjacent said bimetallic element, and a second heating electrically located intermediate said point and said first section and physically arranged adjacent said bimetallic element, said first heating element having a relatively low resistance and said second heating element having a relatively high resistance.

5. A multispeed single phase alternating current induction-type motor comprising a first running winding section, at least one additional running winding section, switch means, conductors respectively extending from said switch means to an end of each of said sections, a conductor extending from the other end of said first section, a bimetallic element connected in series with said sections, and a heating element provided for each additional winding section and connected in series therewith between that one of said conductors which extends to one end of such additional section and that one of said conductors which extends to one end of the electrically adjacent section, each said heating element being arranged physically adjacent said bimetallic element, said switch means being arranged so as selectively to engage one of said conductors which extends from the one end of each of said sections thereby to select a predetermined number of winding sections for connection across a source of alternating current power.

No references cited.